US012757215B2

(12) United States Patent
Marcone et al.

(10) Patent No.: US 12,757,215 B2
(45) Date of Patent: Oct. 6, 2026

(54) CONFIGURATION OF PDCCH

(71) Applicant: Nokia Technologies Oy, Espoo (FI)

(72) Inventors: Alessio Marcone, Munich (DE); Bo Bi, Hangzhou (CN); Frank Frederiksen, Klarup (DK); Arman Ahmadzadeh, Munich (DE)

(73) Assignee: Nokia Technologies Oy, Espoo (FI)

( * ) Notice: Subject to any disclaimer, the term of this patent is extended or adjusted under 35 U.S.C. 154(b) by 265 days.

(21) Appl. No.: 18/755,337

(22) Filed: Jun. 26, 2024

(65) Prior Publication Data

US 2025/0008524 A1 Jan. 2, 2025

Related U.S. Application Data

(63) Continuation of application No. PCT/CN2023/105270, filed on Jun. 30, 2023.

(51) Int. Cl.

| | |
|---|---|
| ***H04W 72/231*** | (2023.01) |
| ***H04W 56/00*** | (2009.01) |
| *H04W 84/06* | (2009.01) |

(52) U.S. Cl.
CPC ..... *H04W 72/231* (2023.01); *H04W 56/0015* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 11,582,658 B1 * | 2/2023 | Kim | H04W 36/0079 | |
| 2023/0232416 A1 * | 7/2023 | Wang | H04W 48/12 | 370/329 |

* cited by examiner

*Primary Examiner* — Kouroush Mohebbi
(74) *Attorney, Agent, or Firm* — Barta Jones, PLLC

(57) ABSTRACT

Example embodiments of the present disclosure relate to apparatuses, methods, and computer readable storage medium for configuration of a physical control channel (PDCCH). In a method, a first apparatus receives, from a second apparatus, a master information block (MIB) message. At least one bit in the MIB message indicates at least one configuration associated with a plurality of repetitions of a PDCCH transmission. Based on the at least one configuration, the first apparatus monitors the plurality of repetitions of the PDCCH transmission from the second apparatus.

20 Claims, 5 Drawing Sheets

CONFIGURATION OF PDCCH

FIELDS

Various example embodiments of the present disclosure generally relate to the field of telecommunication and in particular, to apparatuses, methods and computer readable storage medium for configuration of a physical control channel (PDCCH).

BACKGROUND

In the third-generation partnership project (3GPP) Release 18 (Rel-18), it is studied for non-terrestrial networks (NTNs) to apply solutions developed by new radio (NR) coverage enhancements to NTNs, and to identify potential issues and enhancements, considering NTN characteristics including large propagation delay and satellite movement. In a preliminary study phase, coverage performance of different uplink (UL) and downlink (DL) channels is assessed, and the bottleneck channels are identified. Such identification leads to the objectives for NTNs to specify physical uplink control channel (PUCCH) enhancements for Message 4 (Msg4) hybrid automatic repeat request (HARQ)-acknowledgement (ACK) (e.g., repetitions) and to study demodulation reference signal (DMRS) bundling for a physical uplink shared channel (PUSCH) taking NTN-specifics (e.g., time-frequency pre-compensation) into account and, if necessary, to specify enhancements to Release 17 (Rel-17) procedures. It is proposed that the scope of the Msg4 HARQ-ACK may be expanded to cover cases for PUCCH transmissions of HARQ-ACK when dedicated PUCCH resources have not been configured (where only targeted UEs support the PUCCH repetitions). Some DL channels need enhancements as well.

SUMMARY

In a first aspect of the present disclosure, there is provided a first apparatus. The first apparatus comprises at least one processor; and at least one memory storing instructions that, when executed by the at least one processor, cause the first apparatus at least to: receive, from a second apparatus, a master information block (MIB) message, wherein at least one bit in the MIB message indicates at least one configuration associated with a plurality of repetitions of a physical downlink control channel (PDCCH) transmission; and monitor, based on the at least one configuration, the plurality of repetitions of the PDCCH transmission from the second apparatus.

In a second aspect of the present disclosure, there is provided a second apparatus. The second apparatus comprises at least one processor; and at least one memory storing instructions that, when executed by the at least one processor, cause the second apparatus at least to: transmit, to a first apparatus, a MIB message, wherein at least one bit in the MIB message indicates at least one configuration associated with a plurality of repetitions of a PDCCH transmission; and transmit, based on the at least one configuration, the plurality of repetitions of the PDCCH transmission to the first apparatus.

In a third aspect of the present disclosure, there is provided a method. The method comprises receiving, from a second apparatus, a MIB message, wherein at least one bit in the MIB message indicates at least one configuration associated with a plurality of repetitions of a PDCCH transmission; and monitoring, based on the at least one configuration, the plurality of repetitions of the PDCCH transmission from the second apparatus.

In a fourth aspect of the present disclosure, there is provided a method. The method comprises transmitting, to a first apparatus, a MIB message, wherein at least one bit in the MIB message indicates at least one configuration associated with a plurality of repetitions of a PDCCH transmission; and transmitting, based on the at least one configuration, the plurality of repetitions of the PDCCH transmission to the first apparatus during.

In a fifth aspect of the present disclosure, there is provided a first apparatus. The first apparatus comprises means for receiving, from a second apparatus, a MIB message, wherein at least one bit in the MIB message indicates at least one configuration associated with a plurality of repetitions of a PDCCH transmission; and means for monitoring, based on the at least one configuration, the plurality of repetitions of the PDCCH transmission from the second apparatus.

In a sixth aspect of the present disclosure, there is provided a second apparatus. The second apparatus comprises means for transmitting, to a first apparatus, a MIB message, wherein at least one bit in the MIB message indicates at least one configuration associated with a plurality of repetitions of a PDCCH transmission; and means for transmitting, based on the at least one configuration, the plurality of repetitions of the PDCCH transmission to the first apparatus.

In a seventh aspect of the present disclosure, there is provided a computer readable medium. The computer readable medium comprises instructions stored thereon for causing an apparatus to perform at least the method according to the third or fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
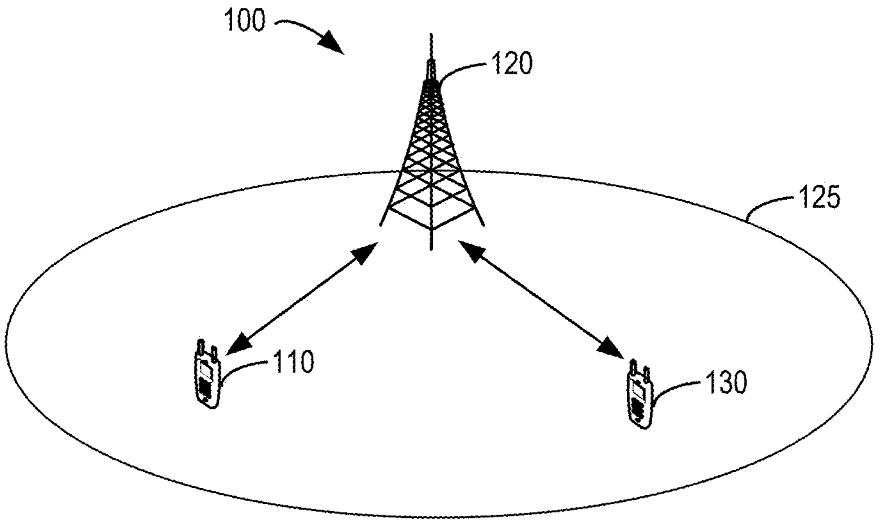
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As mentioned above, in Rel-18, the coverage enhancement to NTNs is focused mostly on UL enhancements, e.g., on enhancements of the Msg4 HARQ-ACK and enhancements to the DMRS bundling framework for PUSCH. However, some DL channels need enhancements as well. When considering satellite power limitations (due to for example regulatory requirements or power split among beams of satellites), the channels related to an initial access need to be enhanced for downlink coverage enhancements. Such channels may include a physical downlink control channel (PDCCH), a physical downlink shared channel (PDSCH) for Message 2 (Msg2) and a PDSCH for Msg4. For example, when considering power flux density (PFD) limits or more generically limits on satellite output power, coverage enhancements for a PDCCH are needed to improve channel performance.

For improving coverage, the following approaches may be considered: (a) lowering the interference and noise contributions, (b) increasing the transmission power, and (c) increasing the energy per bit (through either reducing the payload or transmitting over longer time). However, the approach (a) is not relevant for the PDCCH enhancements, and the approach (b) are not possible due to the PFD limits. The approach (c) may be achieved by introducing repetitions of the channel to be enhanced. For example, for improving the physical layer performance of a channel, a larger number of resources may be assigned to the data or control channel transmission for a certain number of bits (in case of data and/or control channel). One approach to achieve this is to repeat the transmission of the payload data with multiple times, to give the possibility to a receiver to combine the received signals and improve the reliability of the demodulated and decoded bits.

In Rel-17, the repetition of UE specific search space (USS) PDCCH has been specified for a multi-transmission and reception point (TRP) feature, and such a mechanism may be extended for NTNs, at least for the PDCCHs in a radio resource control (RRC) connected mode. However, the repetition feature does not apply to the PDCCH in an initial access and, specifically, to Type0-PDCCH configured. In the enhancements of the coverage of Type0-PDCCH, Type0-PDCCH may be repeated multiple times in a same or different slot, thereby allowing a UE to combine the received Type0-PDCCH transmissions.

However, in order to be able to combine the multiple Type0-PDCCH repetitions, it is beneficial for the UE to know at least if and preferably how many repetitions are being transmitted by a gNB, and hence possibly determine a time span of the Type0-PDCCH repetitions. Therefore, there is a need for methods of configuration for Type0-PDCCH with repetitions.

Example embodiments of the present disclosure propose a configuration scheme for PDCCH coverage enhancements. This scheme uses at least one bit in a master information block (MIB) message to indicate PDCCH coverage enhancements, such as PDCCH repetitions, a larger aggregation level of a PDCCH (i.e., aggregation level 32), extended PDCCH resources and/or the like. In some embodiments, one or more fields or bits in MIB may be used or repurposed to convey a configuration of PDCCH repetitions.

In this way, a receiver such as a UE may know that it is operating under a specific deployment of PDCCH coverage enhancements such as PDCCH repetitions. Some additional operations such as monitoring of the PDCCH repetitions may be implemented under this deployment. Thus, PDCCH coverage enhancements may be achieved effectively and efficiently.

It is to be noted that although the proposed scheme is originating from an NTN scenario, the proposed scheme herein may be applied in general for any deployment scenario. In the following, some example embodiments will be described using PDCCH repetitions as an example implementation of PDCCH coverage enhancements while the example embodiments herein can be applied in general for any other implementations of the PDCCH coverage enhancements. Moreover, some example embodiments will be described using Type0-PDCCH as an example implementation of a PDCCH while the example embodiments herein can be applied in general for any other types of PDCCHs.

FIG. 1 shows an example communication environment 100 in which example embodiments of the present disclosure can be implemented.

In the communication environment 100, a plurality of communication devices, comprising a first apparatus 110 and a second apparatus 120, can communicate with each other. In an example, the first apparatus 110 may operate as a terminal device such as a UE, and the second apparatus 120 may operate as a network device such as a gNB. The second apparatus 120 may serve a coverage area, called a cell 125. The first apparatus 110 may have access to a communication network via the cell 125.

In some example embodiments, a third apparatus 130 may be also deployed in the communication environment 100 which can communicate with both the first apparatus 110 and the second apparatus 120. In an example, the third apparatus 130 may operate as another terminal device. In some example embodiments, the first apparatus 110, the second apparatus 120 and the third apparatus 130 may be configured to implement a beamforming technique and communicate with each other via a plurality of beams.

In the following, for the purpose of illustration, some example embodiments are described with the first apparatus 110 operating as a terminal device and the second apparatus 120 operating as a network device. However, in some example embodiments, operations described with respect to a terminal device may be implemented at a network device or other devices, and operations described with respect to a network device may be implemented at a terminal device or other devices.

In some example embodiments, if the first apparatus 110 is a terminal device and the second apparatus 120 is a network device, a link from the second apparatus 120 to the first apparatus 110 is referred to as a DL, while a link from the first apparatus 110 to the second apparatus 120 is referred to as a UL. In DL, the second apparatus 120 is a Tx device (or a transmitter), and the first apparatus 110 is a Rx device (or a receiver). In UL, the first apparatus 110 is a Tx device (or a transmitter), and the second apparatus 120 is a Rx device (or a receiver). If the first apparatus 110 and the second apparatus 120 are both terminal devices, a link between the first apparatus 110 and the second apparatus 120 is referred to as a sidelink (SL). In SL, one of the first apparatus 110 and the second apparatus 120 is a Tx device (or a transmitter), and the other of the first apparatus 110 and the second apparatus 120 is a Rx device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of devices and their connections are shown in FIG. 1 only for the purpose of illustration without suggesting any limitation. The communication environment 100 may include any suitable number of devices configured to implement example embodiments of the present disclosure.

In some example embodiments, during cell search, a UE, which may be an example implementation of the third apparatus 130, may determine a control resource set (CORESET) and a search space (e.g., a time domain location) for Type0-PDCCH from an MIB message from a gNB, which may be an example implementation of the second apparatus 120.

MIB is carried by a physical channel called physical broadcast channel (PBCH), and the PBCH is a part of a SS/PBCH block (SSB). SSB carries PSS (Primary Sync Signal), SSS (Secondary Sync Signal) and PBCH.

The MIB message may be defined as follows:

```
MIB ::= SEQUENCE {
  systemFrameNumber BIT STRING (SIZE (6)),
  subCarrierSpacingCommon ENUMERATED {scs15or60, scs30or120},
  ssb-SubcarrierOffset INTEGER (0..15),
  dmrs-TypeA-Position ENUMERATED {pos2, pos3},
  pdcch-ConfigSIB1 PDCCH-ConfigSIB1,
  cellBarred ENUMERATED {barred, notBarred},
  intraFreqReselection ENUMERATED {allowed, notAllowed},
  spare BIT STRING (SIZE (1))
}
```

The field cellBarred indicates whether the cell is barred. This field may be ignored by Integrated Access Backhaul Mobile Termination (IAB-MT). This field may be also ignored for connectivity to an NTN.

The field ssb-SubcarrierOffset indicates a frequency domain offset between a synchronization signal and physical broadcast channel (PBCH) block (SS/PBCH block or SSB) and the overall resource block grid in number of subcarriers. This field corresponds to $k_{SSB}$ or k_ssb. The value range of this field may be extended by an additional most significant bit (MSB) encoded within a physical broadcast channel (PBCH). This field may indicate that this cell does not provide system information block 1 (SIB1) and that there is hence no CORESET for Type0-PDCCH common search space (CSS) set (also referred to as CORESET #0 or CORESET 0) configured in MIB. In this case, the field pdcch-ConfigSIB1 may indicate in units of Global Synchronization Channel Number (GSCN) the frequency positions where the UE may or may not find a SS/PBCH with a control resource set and search space for SIB1. The parameters pdcch-ConfigSIB1 and k_ssb for determination of whether CORESET0 is present and for determination of a time-frequency location of CORESET0 and Type0-PDCCH monitoring occasions are conveyed via the MIB message.

CORESET 0 is a special type of CORESET which carries PDCCH/DCI for SIB1. The resource allocation (i.e., time and frequency domain resource allocation) for CORESET 0 is configured by MIB (i.e., carried in PBCH in SSB). Other types of CORESET is configured by e.g., SIB or RRCSetup/RRCReconfiguration, but CORESET 0 cannot be configured by SIB or other RRC messages because it should be known before SIB or other RRC messages is detected. The starting position of CORESET 0 in a frequency domain may be defined with reference to a SSB position.

Upon detection of a SS/PBCH block, the UE may determine from the MIB parameters such as the field ssb-SubcarrierOffset (or $k_{SSB}$ or k_ssb) that a CORESET for Type0-PDCCH CSS set (i.e., CORESET 0) is present. For example, the UE may determine that CORESET0 is present if $k_{SSB}<24$ for frequency range 1 (FR1) or if $k_{SSB}<12$ for frequency range 2 (FR2). The UE may determine that CORESET0 is not present if $k_{SSB}>23$ for FR1 or if $k_{SSB}>11$ for FR2. In other words, based on the value of k_ssb, the UE may understand if a CORESET0 is present or not for a certain SSB.

For example, if the UE determines from the MIB message that CORESET0 is present, the UE may determine a number of consecutive resource blocks and a number of consecutive symbols for CORESET0 from controlResourceSetZero in the field pdcch-ConfigSIB1 and also determine PDCCH monitoring occasions from searchSpaceZero in pdcch-ConfigSIB1.

If the UE detects a first SS/PBCH block and determines that a CORESET for Type0-PDCCH CSS set is not present, and for $24 \leq k_{SSB} \leq 29$ for FR1 or for $12 \leq k_{SSB} \leq 13$ for FR2, the UE may determine the nearest global synchronization channel number (GSCN) of a second SS/PBCH block (in the corresponding frequency direction) having a CORESET for an associated Type0-PDCCH CSS set as $$N_{GSCN}^{Reference} + N_{GSCN}^{Size} \cdot N_{GSCN}^{Offset} \cdot N_{GSCN}^{Reference}$$

is the GSCN of the first SS/PBCH block, $$N_{GSCN}^{Size} = 1 \text{ in } FR1$$

and frequency range 2-1 (FR2-1), $$N_{GSCN}^{Size} = 3$$

in frequency range 2-2 (FR2-2), and $$N_{GSCN}^{Offset}$$

is a GSCN offset. If the UE detects the second SS/PBCH block and the second SS/PBCH block does not provide a CORESET for Type0-PDCCH CSS set, the UE may ignore the information related to the GSCN of SS/PBCH block locations for performing cell search. The first and second SS/PBCH block (or SSB) refer to SSBs in different frequency positions (GSCN) for a same SSB index. In other words, if the UE assesses that CORESET0 is not present for a first SSB (k_ssb>23 in FR1), the UE may use the k_ssb and pdcch-ConfigSIB1 values to determine a second frequency position where an SSB with associated CORESET0 is present. However, if the second SSB does not actually have associated CORESET0 (k_ssb of the second SSB still larger than 23), the UE may ignore the information given by k_ssb>23 and pdcch-ConfigSIB1.

If a UE detects a SS/PBCH block and determines that a CORESET for Type0-PDCCH CSS set is not present, and for $k_{SSB}=31$ for FR1 or for $k_{SSB}=15$ for FR2, the UE may determine that there is no SS/PBCH block (SSB) having an associated Type0-PDCCH CSS set within a range of GSCNs or a GSCN range $$\left[N_{GSCN}^{Reference} - N_{GSCN}^{Start}, N_{GSCN}^{Reference} + N_{GSCN}^{End}\right]. \; N_{GSCN}^{Start} \text{ and } N_{GSCN}^{End}$$

are respectively determined by controlResourceSetZero and SearchSpaceZero in pdcch-ConfigSIB1. If the GSCN range is $$\left[N_{GSCN}^{Reference}, N_{GSCN}^{Reference}\right],$$

the UE may determine that there is no information for a second SS/PBCH block with a CORESET for an associated Type0-PDCCH CSS set on the detected SS/PBCH block.

Table 1 shows mapping between the combination of $k_{SSB}$ and controlResourceSetZero and searchSpaceZero in pdcch-ConfigSIB1 to $$N_{GSCN}^{Offset}$$

for FR1:

TABLE 1

| $k_{SSB}$ | 16 × controlResourceSetZero + searchSpaceZero | $N_{GSCN}^{Offset}$ |
|---|---|---|
| 24 | 0, 1, . . . , 255 | 1, 2, . . . , 256 |
| 25 | 0, 1, . . . , 255 | 257, 258, . . . , 512 |
| 26 | 0, 1, . . . , 255 | 513, 514, . . . , 768 |
| 27 | 0, 1, . . . , 255 | −1, −2, . . . , −256 |
| 28 | 0, 1, . . . , 255 | −257, −258, . . . , −512 |
| 29 | 0, 1, . . . , 255 | −513, −514, . . . , −768 |
| 30 | 0, 1, . . . , 255 | Reserved, Reserved, . . . , Reserved |

In some example embodiments, PDCCH repetitions are enabled between the first apparatus 110 and the second apparatus 120 via a MIB message. At least one configuration associated with the PDCCH repetitions is transmitted by the second apparatus 120 to the first apparatus 110 via at least one bit of the MIB message. Some example implementations will be discussed below with reference to FIG. 2.

Figure 2:
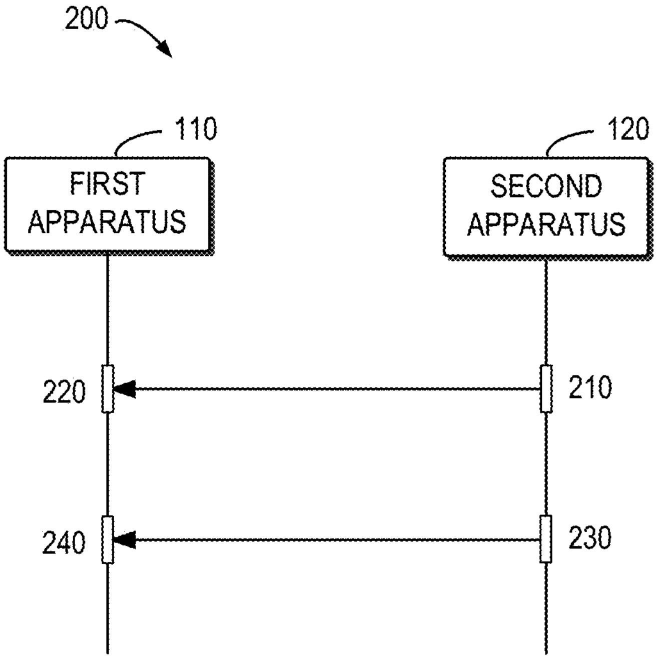
FIG. 2 illustrates a signaling diagram for an example communication process in accordance with some example embodiments of the present disclosure.

FIG. 2 illustrates a signaling diagram for an example communication process 200 between the first and second apparatus 110 and 120 according to some example embodiments of the present disclosure.

As shown in FIG. 2, the second apparatus 120 may transmit (210) a MIB message to the first apparatus 110. At least one bit in the MIB message indicates at least one configuration associated with a plurality of repetitions of a PDCCH transmission (also referred to as PDCCH repetitions). Accordingly, the first apparatus 110 may receive (220) the MIB message indicating the at least one configuration. In the example embodiments where the PDCCH is Type0-PDCCH, the at least one configuration may comprise a configuration of Type0-PDCCH with repetitions.

In some example embodiments, the at least one configuration associated with PDCCH repetitions may comprise a repetition factor of the plurality of repetitions. In some example embodiments, the at least one configuration may comprise an indication that the plurality of repetitions is enabled. Such an indication may be a trigger of a specified repetition framework.

In some example embodiments, the at least one configuration associated with PDCCH repetitions may comprise information on a starting PDCCH monitoring occasion for the plurality of repetitions. Alternatively, or in addition, the at least one configuration may comprise a periodicity of the starting PDCCH monitoring occasion for the plurality of repetitions.

The at least one configuration may be indicated via using, reusing and/or repurposing of bit(s) or field(s) of the MIB message. In an example, at least one spare bit may be used or repurposed to convey the at least one configuration. In another example, a set (referred to "a first set") of bits for indicating whether a cell is barred, such as the field cellBarred, may be used or repurposed to convey the configuration.

In some example embodiments, the spare bit and the first set of bits for indicating whether a cell is barred may be used together to convey the configuration associated with the PDCCH repetitions. In an example, a combination of the two fields, e.g., the spared bit field and the field cellBarred, may generate codepoints associated with different repetition factors. Table 2 shows example mapping between Type0-PDCCH repetition factors and such codepoints.

TABLE 2

| Codepoint generated via combination of the two fields | Type0-PDCCH repetition factor |
|---|---|
| 00 | 1 |
| 01 | 2 |
| 10 | 4 |
| 11 | 8 |

It is to be understood that the codepoints as shown in Table 2 are only illustrative but not limited. There may be any form of mapping or correspondence between the combination of the spare bit and the first set of bits and the configuration associated with the PDCCH repetitions. Furthermore, in an embodiment, only the spare bit or only the field cellBarred may be used for indicating the configuration, such as the repetition factor. For example, the spare bit may take a value of 0 or 1, which may map respectively to a certain number of repetitions or may trigger a specified repetition framework.

In some example embodiments, the first apparatus 110 may determine mapping information between the at least one configuration and the at least one bit in the MIB message. The mapping information may be implemented e.g., in a form of table, e.g., as shown in Table 2. Based on this mapping information, the first apparatus 110 may determine the at least one configuration. For example, in the case that Table 2 is used to indicate the mapping information, a repetition factor may be determined by the first apparatus 110 via the corresponding codepoint, the codepoint being the combination of the two bits in Table 2, for example.

This mapping information may be predefined, e.g., in the 3GPP standards. Alternatively, or in addition, the first apparatus 110 may receive the mapping information from the second apparatus 120, e.g., via a radio resource control (RRC) message when the first apparatus 110 is in a RRC connected state.

In some example embodiments, the at least one configuration associated with the PDCCH repetitions may be indicated via a set (referred to as a second set) of bits of the MIB message for indicating a subcarrier offset between a SSB (referred to as a first SSB) and a reference resource block grid or for indicating whether the first SSB has a CORESET for an associated PDCCH, such as the field ssb-SubcarrierOffset (i.e., k_ssb). For example, a specific entry or specific entries of the field ssb-SubcarrierOffset may be used for the configuration.

In some example embodiments, the second set of bits may have a value for indicating the at least one configuration to the first apparatus 110 for a PDCCH transmission associated with the first SSB or another SSB (referred to as a second SSB). In an example, the value may be from a range of values. The range of values may comprise a value between 24 and 29 in FR1 or a value between 12 and 13 in FR2. For the third apparatus 130, which may operate as a PDCCH repetition non-capable UE or a legacy UE, the value from the range of values may indicate that no PDCCH is associated with the first SSB.

Taking the field ssb-SubcarrierOffset (indicated as k_ssb) as an example of the second set of bits, the values of k_ssb between 24 and 29 for FR1 and 12 and 13 for FR2 may be used by the second apparatus 120 for indication of a second SSB that may have an associated CORESET0 configured with repetitions. The frequency location of the second SSB may be determined by the first apparatus 110 via the mapping in Table 1. The first and second SSB refer to SSBs in different frequency positions (GSCN) for a same SSB index. In an example, specific entries of k_ssb between 24 and 29 (e.g., k_ssb=24) for FR1 and k_ssb between 12 and 13 (e.g., k_ssb=12) in the MIB message of the first SSB, may be used to indicate to the first apparatus 110 that such first SSB does not have an associated CORESET0, but that the second SSB has an associated CORESET0 configured with repetitions, where the repetition factor (or number of repetitions) is determined by the first apparatus 110 via standard specifications.

In some embodiments, the values of k_ssb between 24 and 29 for FR1 and 12 and 13 for FR2 may be used by the second apparatus 120 for indication of a second SSB that may have an associated CORESET0 configured with a certain number of repetitions. In an example, the entry k_ssb=24 may be used to indicate to the first apparatus 110 that such first SSB does not have an associated CORESET0, but that the second SSB has an associated CORESET0 configured with 2 repetitions (i.e., the repetition factor equal to 2). In an example, the entry k_ssb=25 may be used to indicate to the first apparatus 110 that such first SSB does not have an associated CORESET0, but that the second SSB has an associated CORESET0 configured with 4 repetitions (i.e., the repetition factor equal to 4).

In some other embodiments, specific entries of k_ssb between 24 and 29 (e.g., k_ssb=24) for FR1 and k_ssb between 12 and 13 (e.g., k_ssb=12) for FR2 in the MIB message of the first SSB, may be used to indicate to the first apparatus 110 that such first SSB may have an associated CORESET0 configured with repetitions. In this case, a PDCCH repetition capable UE may interpret the value of k_ssb differently than a legacy UE. For example, for a PDCCH repetition capable UE, this value means that the SSB is associated to CORESET0 configured with repetitions. In this case, the second apparatus 120 anyway transmits Type0-PDCCH according to associated CORESET0. Other UEs may instead look in other SSB frequency locations (GSCN) for CORESET0, for example, as defined by the Rel-18 specifications.

In some embodiments, the values of k_ssb between 24 and 29 for FR1 and 12 and 13 for FR2 may be used by the second apparatus 120 for indication of the first SSB may have an associated CORESET0 configured with a certain number of repetitions. In an example, the entry k_ssb=24 may be used to indicate to the first apparatus 110 that the first SSB has an associated CORESET0 configured with 2 repetitions (i.e., the repetition factor equal to 2). In an example, the entry k_ssb=25 may be used to indicate to the first apparatus 110 that the first SSB has an associated CORESET0 configured with 4 repetitions (i.e., the repetition factor equal to 4).

In some example embodiments, the value of the second set of bits is a reserved value, e.g., 30 in FR1 or 14 in FR2, to indicate to the first apparatus 110 that the PDCCH transmission associated with the first SSB is configured with a plurality of repetitions. For example, an entry k_ssb=30 for FR1 and k_ssb=14 for FR2 in the MIB message of the first SSB may be used to indicate to the first apparatus 110 that such first SSB has associated CORESET0 configured with repetitions. In this case, the repetition factor (or number of repetitions) may be determined by the first apparatus 110 via standard specifications. In this case, the repetition factor (or number of repetitions) may be indicated to the first apparatus 110 via at least one bit of the field pdcch-ConfigSIB1.

In some example embodiments, in the case the value of k_ssb is used for conveying information on whether the CORESET0 of the first or second SSB is configured with repetitions, the subcarrier offset between the first SSB and the reference resource block grid (necessary information for reception of the CORESET0) may be equal to the value of the second set of bits such as k_ssb. In an example, in the embodiments where the entry k_ssb=24 is used to indicate to the first apparatus 110 that the first SSB has an associated CORESET0 configured with 2 repetitions, k_ssb=24 may not only be used to indicate to the first apparatus 110 that the first SSB has an associated CORESET0 configured with 2 repetitions but also that the subcarrier offset between the first SSB and the reference resource block grid is equal to 24 subcarriers.

In some example embodiments, the subcarrier offset may be associated with the value and a predetermined offset, for example, be equal to k_ssb minus an offset. In an example, in the embodiments where the entry k_ssb=24 is used to indicate to the first apparatus 110 that the first SSB has an associated CORESET0 configured with 2 repetitions, k_ssb=24 may not only be used to indicate to the first apparatus 110 that the first SSB has an associated CORESET0 configured with 2 repetitions but also that the subcarrier offset between the first SSB and the reference resource block grid is equal to 24 subcarriers minus an offset in units of subcarrier. The offset could cause the values of k_ssb larger than 23 to be transposed in k_ssb range between 0 and 23. In an example, the offset could be equal to 11 subcarriers, so that the subcarrier offset between the first SSB and the reference resource block grid is equal to 13 subcarriers. Alternatively, or in addition, the subcarrier offset may be predefined, e.g., to be specified value. For example, the first apparatus 110 may determine the frequency domain offset between the SSB and the overall resource block grid in number of subcarriers (which may be conveyed to the third apparatus 130 as a legacy UE through the value of k_ssb) to be equal to k_ssb or to be equal to k_ssb minus an offset. In some example embodiments, the subcarrier offset may be equal to a specified value (e.g., 0).

In some example embodiments, the value of the second set of bits may indicate to the first apparatus 110 that an SSB having a CORESET for an associated PDCCH configured with repetitions is in a frequency range of GSCN values. In an example, this value of the second set of bits may be 31 in FR1 or 15 in FR2. The value may indicate to the third apparatus 130, which may operate as a legacy UE, that an SSB having a CORESET for an associated PDCCH is absent in the range of GSCNs.

By way of example, the entry k_ssb=31 for FR1 and k_ssb=15 for FR2 in the MIB message of a first SSB is used to indicate to the first apparatus 110 that the first apparatus 110 can find an SSB with associated CORESET0 configured with repetitions in the range $$[N_{GSCN}^{Reference} - N_{GSCN}^{Start}, N_{GSCN}^{Reference} + N_{GSCN}^{End}].$$

In this case, the repetition factor (or number of repetitions) may be determined by the first apparatus 110 via standard specifications. In this case, the repetition factor (or number of repetitions) may be determined by the first apparatus 110 via the frequency position within the range $$[N_{GSCN}^{Reference} - N_{GSCN}^{Start}, N_{GSCN}^{Reference} + N_{GSCN}^{End}]$$

where the SSB with associated CORESET0 configured with repetitions is found.

In some example embodiments, the at least one configuration associated with the PDCCH repetitions may be indicated via a set (referred to as a third set) of bits of the MIB message for indicating a CORESET, a common search space and PDCCH parameters or for indicating frequency positions where an SSB with SIB1 can or cannot be found, such as the field pdcch-ConfigSIB1. In an example, at least one bit of the third set of bits such as the field pdcch-ConfigSIB1 may be used or repurposed to indicate the number of PDCCH repetitions.

In some example embodiments, a combination of the at least one spare bit, the first set of bits (such as the field cellBarred), the second set of bits (such as the field k_ssb) and the third set of bits may be used to indicate where CORESET0 with repetitions is located (e.g., to which SSB is associated) and to determine the number of PDCCH repetitions of such CORESET0.

In some example embodiments, the repurposed or reused bits in the MIB message may be valid for PDCCH repetition capable UE. The non-capable UE (Rel-19 or Rel-18 UEs non-capable of PDCCH repetitions) may ignore the configuration and still work in a legacy way, e.g., with no repetition of Type0-PDCCH.

In some example embodiments, the configuration of PDCCH (such as Type0-PDCCH) repetitions may apply to a band for an NTN, or NTN bands. In this case, the PDCCH repetitions is performed in the NTN scenario, via access to specific frequency bands.

As shown in FIG. 2, after the second apparatus 120 transmits (210), to the first apparatus 110, the MIB message to indicate the at least one configuration associated with the PDCCH repetitions, the second apparatus 120 may transmit (230) the PDCCH repetitions to the first apparatus 110 based on the at least one configuration. Accordingly, the first apparatus 110 may monitor (240) the PDCCH repetitions from the second apparatus 120 based on the at least one configuration.

In some example embodiments, in the process of reception and decoding of the PDCCH repetitions, the first apparatus 110 may combine the repetitions before decoding. In some other example embodiments, the first apparatus 110 may decode the single PDCCH repetitions, relying on the channel variability over time.

Figure 3:
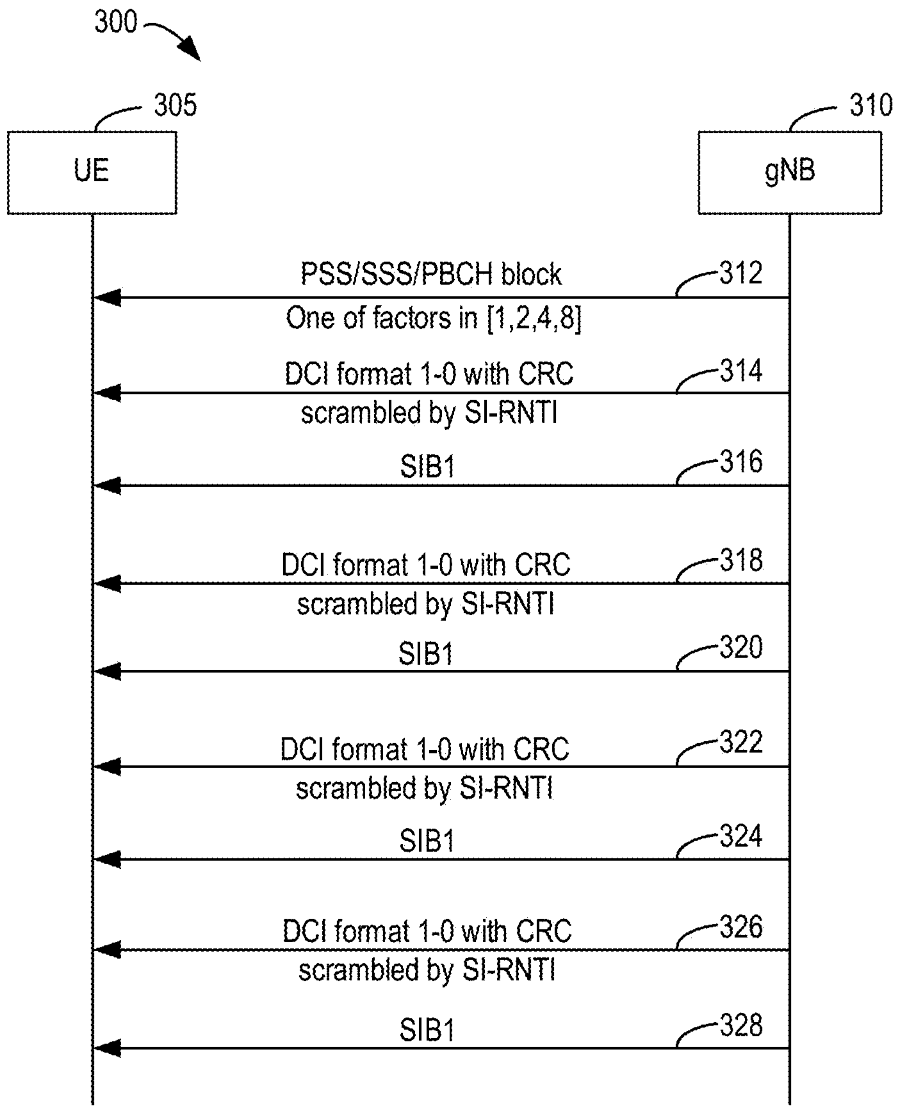
FIG. 3 illustrates an example process of PDCCH repetition configuration in accordance with some example embodiments of the present disclosure.

FIG. 3 shows an example process 300 of PDCCH repetition configuration in accordance with some example embodiments of the present disclosure. In this example, a UE 305 is an example implementation of the first apparatus 110, and a gNB 310 is an example implementation of the second apparatus 120.

In the process 300, at 312, the UE 305 may receive a configuration of a repetition factor, e.g., which is one of the factors in [1, 2, 4, 8], from the gNB 310 via MIB. Then, the UE may know that the repetition is enabled and get the repetition factor, e.g, 4 in the example of FIG. 3.

In an example, the configuration of the repetition factor may be conveyed by the combination of the spare field and the cellBarred field in MIB. For example, the spare field may be substituted by the field "Type0-PDCCH repetitions", and the field may take value 0 or 1. The cellBarred field may be unchanged but repurposed so that a value "barred" indicates a bit value 1 and a value "notBarred" indicates a bit value 0. The two bits may be put together to generate a codepoint corresponding to a Type0-PDCCH repetition factor as shown in Table 2 above.

An example of MIB is illustrated as below.

```
MIB ::= SEQUENCE {
  systemFrameNumber BIT STRING (SIZE (6)),
  subCarrierSpacingCommon ENUMERATED {scs15or60, scs30or120},
  ssb-SubcarrierOffset INTEGER (0..15),
  dmrs-TypeA-Position ENUMERATED {pos2, pos3},
  pdcch-ConfigSIB1 PDCCH-ConfigSIB1,
  cellBarred ENUMERATED {barred, notBarred},
  intraFreqReselection ENUMERATED {allowed, notAllowed},
  Type0-PDCCH repetitions BIT STRING (SIZE (1))
}
```

The UE 305 may further know frequency domain resources from controlResourceSetZero and time domain resources from SearchSpaceZero in the field pdcch-ConfigSIB1. Then, the UE 305 may start monitoring repetitions.

As shown in FIGS. 3, at 314, 316, 318, 320, 322, 324, 326 and 328, the gNB 310 may transmit the PDCCH and PDSCH in the repetition occasions of slots and frames, indicated by system frame numbers (SFNs). Accordingly, the UE 305 may monitor each repetition occasion and detect the DCI 1_0 scheduling SIB1 after combining the Type0-PDCCH repetitions. The UE 305 may perform blind decoding for the Type0-PDCCH transmission and repetitions.

In another example, the configuration of Type0-PDCCH repetitions received (312) via MIB may be carried in the field ssb-SubcarrierOffset in FR1. In this case, the MIB of a first SSB may be used to indicate to the UE 305 that such first SSB has an associated CORESET0 configured with repetitions via the reserved entry k_ssb=30. Thus, non-capable UEs (not shown) may assume that the CORESET0 associated to such first SSB in not present, while PDCCH repetition capable UEs such as the UE 305 may determine that the detected SSB has an associated CORESET0 with repetitions.

In an example, the UE 305 may determine from the specifications that the frequency domain offset between the first SSB and the overall resource block grid in number of subcarriers is equal to a specified value (e.g., 0 subcarrier, which means that the overall resource block grid and the first SSB are aligned in frequency). Moreover, the UE 305 may determine via the field pdcch-ConfigSIB1 in MIB of the first SSB two pieces of information, considering that pdcch-ConfigSIB1 has a size of 8 bits, divided in 4 bits for controlResourceSetZero and 4 bits for SearchSpaceZero. In an example, the first 2 MSBs of controlResourceSetZero indicate the number of Type0-PDCCH repetitions, and the remaining 2 bits of controlResourceSetZero are used to determine a number of consecutive resource blocks and a number of consecutive symbols of CORESET0. In another example, the 2 MSBs of SearchSpaceZero indicate the number of Type0-PDCCH repetitions. Then, the UE 305 may start monitoring PDCCH repetitions at 314.

Any type of combination of the spare bit and the first, second and third sets of bits may be used to indicate the configuration to the UE 305.

Example Methods

Figure 4:
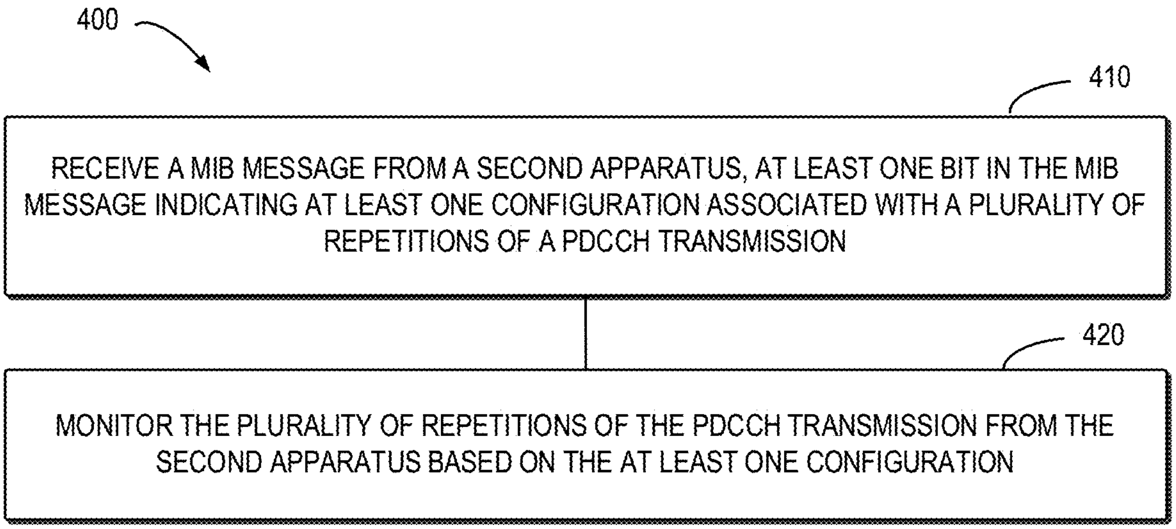
FIG. 4 illustrates a flow chart of an example method of PDCCH configuration in accordance with some example embodiments of the present disclosure.

FIG. 4 shows a flowchart of an example method 400 of PDCCH configuration in accordance with some example embodiments of the present disclosure. The method 400 can be implemented by the first apparatus 110 as shown in FIG. 1. For the purpose of discussion, the method 400 will be described from the perspective of the first apparatus 110 with reference to FIG. 1.

At block 410, the first apparatus 110 receives, from the second apparatus 120, a MIB message. At least one bit in the MIB message indicates at least one configuration associated with a plurality of repetitions of a PDCCH transmission. At block 420, based on the at least one configuration, the first apparatus 110 monitors the plurality of repetitions of the PDCCH transmission from the second apparatus 120.

In some example embodiments, the at least one configuration may comprise at least one of: a repetition factor of the plurality of repetitions; an indication that the plurality of repetitions is enabled; information on a starting PDCCH monitoring occasion for the plurality of repetitions; or a periodicity of the starting PDCCH monitoring occasion for the plurality of repetitions.

In some example embodiments, the first apparatus 110 may determine mapping information between the at least one configuration and the at least one bit in the MIB message.

In some example embodiments, the at least one bit in the MIB message may comprise at least one of: at least one spare bit; a first set of bits for indicating whether a cell is barred; a second set of bits for indicating a subcarrier offset between a first SSB and a reference resource block grid or for indicating whether the first SSB has a CORESET for an associated PDCCH, or a third set of bits for indicating a CORESET, a common search space and PDCCH parameters or for indicating frequency positions where an SSB with SIB1 can or cannot be found.

In some example embodiments, a combination of the at least one spare bit and the first set of bits may be used to indicate the at least one configuration.

In some example embodiments, the second set of bits may comprise a value for indicating the at least one configuration to the first apparatus 110 for a PDCCH transmission associated with the first SSB or a second SSB.

In some example embodiments, the value may be from a range of values for indicating the at least one configuration to the first apparatus 110. The value from the range of values may indicate to the third apparatus 130 that no PDCCH is associated with the first SSB. In some example embodiments, the value may be between 24 and 29 in FR1 or between 12 and 13 in FR2.

In some example embodiments, the value of the second set of bits may be 30 in FR1 or 14 in FR2.

In some example embodiments, the subcarrier offset between the first SSB and the reference resource block grid may be predefined, or associated with the value of the second set of bits and a predetermined offset.

In some example embodiments, the value of the second set of bits may indicate to the first apparatus 110 that an SSB having a CORESET for an associated PDCCH configured with repetitions is in a range of GSCNs. The value may indicate to the third apparatus 130 that an SSB having a CORESET for an associated PDCCH is absent in the range of GSCNs. In some example embodiments, the value may be 31 in FR1 or 15 in FR2.

In some example embodiments, at least one bit of the third set of bits may be used to indicate the number of repetitions of the PDCCH transmission.

In some example embodiments, the PDCCH may comprise Type0-PDCCH.

In some example embodiments, the PDCCH transmission may be performed in a band for an NTN.

Figure 5:
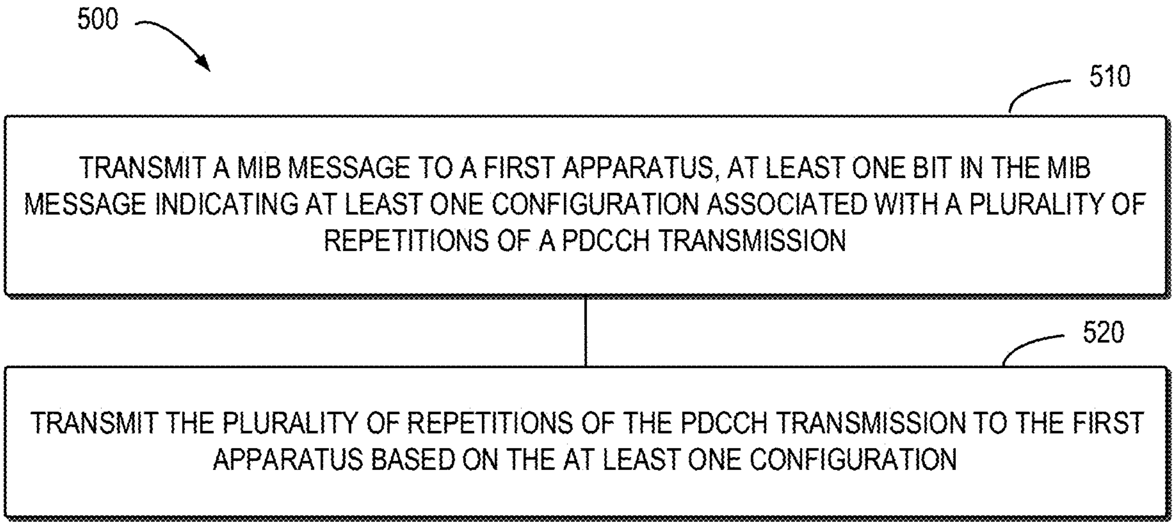
FIG. 5 illustrates a flow chart of another example method of PDCCH configuration in accordance with some example embodiments of the present disclosure.

FIG. 5 shows a flowchart of an example method 500 of PDCCH configuration in accordance with some example embodiments of the present disclosure. The method 500 can be implemented by the second apparatus 120 as shown in FIG. 1. For the purpose of discussion, the method 500 will be described from the perspective of the second apparatus 120 with reference to FIG. 1.

At block 510, the second apparatus 120 transmits, to the first apparatus 110, a MIB message. At least one bit in the MIB message indicates at least one configuration associated with a plurality of repetitions of a PDCCH transmission. At block 520, the second apparatus 120 transmits the plurality of repetitions of the PDCCH transmission to the first apparatus 110 based on the at least one configuration.

In some example embodiments, the at least one configuration may comprise at least one of: a repetition factor of the plurality of repetitions; an indication that the plurality of repetitions is enabled; information on a starting PDCCH monitoring occasion for the plurality of repetitions; or a periodicity of the starting PDCCH monitoring occasion for the plurality of repetitions.

In some example embodiments, the second apparatus 120 may determine mapping information between the at least one configuration and the at least one bit in the MIB message.

In some example embodiments, the at least one bit in the MIB message may comprise at least one of: at least one spare bit; a first set of bits for indicating whether a cell is barred, a second set of bits for indicating a subcarrier offset between a first SSB and a reference resource block grid or for indicating whether the first SSB has a CORESET for an associated PDCCH, or a third set of bits for indicating a CORESET, a common search space and PDCCH parameters or for indicating frequency positions where an SSB with SIB1 can or cannot be found.

In some example embodiments, a combination of the at least one spare bit and the first set of bits may be used to indicate the at least one configuration.

In some example embodiments, the second set of bits may comprise a value for indicating the at least one configuration to the first apparatus 110 for a PDCCH transmission associated with the first SSB or a second SSB.

In some example embodiments, the value may be from a range of values for indicating the at least one configuration to the first apparatus 110. The value from the range of values may indicate to the third apparatus 130 that no PDCCH is associated with the first SSB. In some example embodiments, the value may be between 24 and 29 in FR1 or between 12 and 13 in FR2.

In some example embodiments, the value of the second set of bits may be 30 in FR1 or 14 in FR2.

In some example embodiments, the subcarrier offset between the first SSB and the reference resource block grid may be predefined, or associated with the value of the second set of bits and a predetermined offset.

In some example embodiments, the value of the second set of bits may indicate to the first apparatus 110 that an SSB having a CORESET for an associated PDCCH configured with repetitions is in a range of GSCNs. The value may indicates to the third apparatus 130 that an SSB having a CORESET for an associated PDCCH is absent in the range of GSCNs. In some example embodiments, the value may be 31 in FR1 or 15 in FR2.

In some example embodiments, at least one bit of the third set of bits may be reused to indicate the number of repetitions of the PDCCH transmission.

All operations and features related to the first apparatus 110 and the second apparatus 120 as described above with reference to FIGS. 1 to 3 are likewise applicable to the methods 400 and 500 and have similar effects. For the purpose of simplification, the details will be omitted.

Example Apparatus, Device and Medium

In some example embodiments, a first apparatus capable of performing the method 400 (for example, the first apparatus 110 in FIG. 1) may comprise means for performing the respective operations of the method 400. The means may be implemented in any suitable form. For example, the means may be implemented in a circuitry or software module. The first apparatus may be implemented as or included in the first apparatus 110 in FIG. 1.

In some example embodiments, the first apparatus comprises means for receiving, from a second apparatus, a master information block (MIB) message, wherein at least one bit in the MIB message indicates at least one configuration associated with a plurality of repetitions of a physical downlink control channel (PDCCH) transmission; and means for monitoring, based on the at least one configuration, the plurality of repetitions of the PDCCH transmission from the second apparatus.

In some example embodiments, the at least one configuration comprises at least one of: a repetition factor of the plurality of repetitions; an indication that the plurality of repetitions is enabled; information on a starting PDCCH monitoring occasion for the plurality of repetitions; or a periodicity of the starting PDCCH monitoring occasion for the plurality of repetitions.

In some example embodiments, the first apparatus further comprises: means for determining mapping information between the at least one configuration and the at least one bit in the MIB message.

In some example embodiments, the at least one bit in the MIB message comprises at least one of: at least one spare bit, a first set of bits for indicating whether a cell is barred, a second set of bits for indicating a subcarrier offset between a first synchronization signal and physical broadcast channel (PBCH) block (SSB) and a reference resource block grid or for indicating whether the first SSB has a CORESET for an associated PDCCH, or a third set of bits for indicating a CORESET, a common search space and PDCCH parameters or for indicating frequency positions where an SSB with SIB1 can or cannot be found.

In some example embodiments, a combination of the at least one spare bit and the first set of bits indicates the at least one configuration.

In some example embodiments, the second set of bits comprises a value for indicating the at least one configuration to the first apparatus for a PDCCH transmission associated with the first SSB or a second SSB.

In some example embodiments, the value is from a range of values for indicating the at least one configuration to the first apparatus, wherein the value from the range of values indicates to a third apparatus that no PDCCH is associated with the first SSB.

In some example embodiments, the value is between 24 and 29 in frequency range 1 or between 12 and 13 in frequency range 2.

In some example embodiments, the value of the second set of bits is 30 in frequency range 1 or 14 in frequency range 2.

In some example embodiments, the subcarrier offset between the first SSB and the reference resource block grid is predefined, or associated with the value of the second set of bits and a predetermined offset.

In some example embodiments, the value of the second set of bits indicates to the first apparatus that an SSB having a CORESET for an associated PDCCH configured with repetitions is in a range of global synchronization channel numbers (GSCNs), wherein the value indicates to a third apparatus that an SSB having a CORESET for an associated PDCCH is absent in the range of GSCNs.

In some example embodiments, the value is 31 in frequency range 1 or 15 in frequency range 2.

In some example embodiments, at least one bit of the third set of bits indicates the number of repetitions of the PDCCH transmission.

In some example embodiments, the PDCCH comprises Type0-PDCCH.

In some example embodiments, the PDCCH transmission is performed in a band for a non-terrestrial network (NTN).

In some example embodiments, the first apparatus further comprises means for performing other operations in some example embodiments of the method 400 or the first apparatus 110. In some example embodiments, the means comprises at least one processor; and at least one memory storing instructions that, when executed by the at least one processor, cause the performance of the first apparatus.

In some example embodiments, a second apparatus capable of performing the method 500 (for example, the second apparatus 120 in FIG. 1) may comprise means for performing the respective operations of the method 500. The means may be implemented in any suitable form. For example, the means may be implemented in a circuitry or software module. The second apparatus may be implemented as or included in the second apparatus 120 in FIG. 1.

In some example embodiments, the second apparatus comprises means for transmitting, to a first apparatus, a master information block (MIB) message, wherein at least one bit in the MIB message indicates at least one configuration associated with a plurality of repetitions of a physical downlink control channel (PDCCH) transmission; and means for transmitting, based on the at least one configuration, the plurality of repetitions of the PDCCH transmission to the first apparatus.

In some example embodiments, the at least one configuration comprises at least one of: a repetition factor of the plurality of repetitions; an indication that the plurality of repetitions is enabled; information on a starting PDCCH monitoring occasion for the plurality of repetitions; or a periodicity of the starting PDCCH monitoring occasion for the plurality of repetitions.

In some example embodiments, the second apparatus further comprises: means for determining mapping information between the at least one configuration and the at least one bit in the MIB message.

In some example embodiments, the at least one bit in the MIB message comprises at least one of: at least one spare bit, a first set of bits for indicating whether a cell is barred, a second set of bits for indicating a subcarrier offset between a first synchronization signal and physical broadcast channel (PBCH) block (SSB) and a reference resource block grid or for indicating whether the first SSB has a CORESET for an associated PDCCH, or a third set of bits for indicating a CORESET, a common search space and PDCCH parameters or for indicating frequency positions where an SSB with SIB1 can or cannot be found.

In some example embodiments, a combination of the at least one spare bit and the first set of bits indicates the at least one configuration.

In some example embodiments, the second set of bits comprises a value for indicating the at least one configuration to the first apparatus for a PDCCH transmission associated with the first SSB or a second SSB.

In some example embodiments, the value is from a range of values for indicating the at least one configuration to the first apparatus, wherein the value from the range of values indicates to a third apparatus that no PDCCH is associated with the first SSB.

In some example embodiments, the value is between 24 and 29 in frequency range 1 or between 12 and 13 in frequency range 2.

In some example embodiments, the value of the second set of bits is 30 in frequency range 1 or 14 in frequency range 2.

In some example embodiments, the subcarrier offset between the first SSB and the reference resource block grid is predefined, or associated with the value of the second set of bits and a predetermined offset.

In some example embodiments, the value of the second set of bits indicates to the first apparatus that an SSB having a CORESET for an associated PDCCH configured with repetitions is in a range of global synchronization channel numbers (GSCNs), wherein the value indicates to a third apparatus that an SSB having a CORESET for an associated PDCCH is absent in the range of GSCNs.

In some example embodiments, the value is 31 in frequency range 1 or 15 in frequency range 2.

In some example embodiments, at least one bit of the third set of bits is reused to indicate the number of repetitions of the PDCCH transmission.

In some example embodiments, the second apparatus further comprises means for performing other operations in some example embodiments of the method 500 or the second apparatus 120. In some example embodiments, the means comprises at least one processor; and at least one memory storing instructions that, when executed by the at least one processor, cause the performance of the second apparatus.

Figure 6:
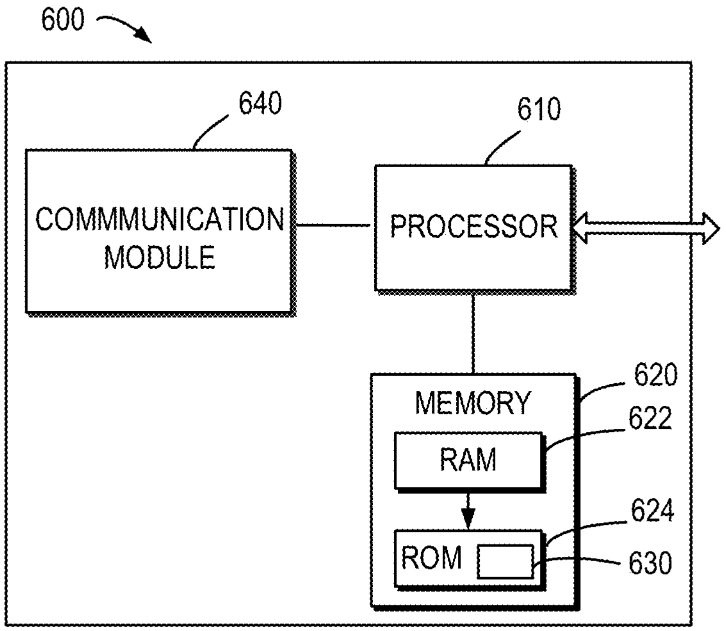
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first apparatus 110 or the second apparatus 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 1 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
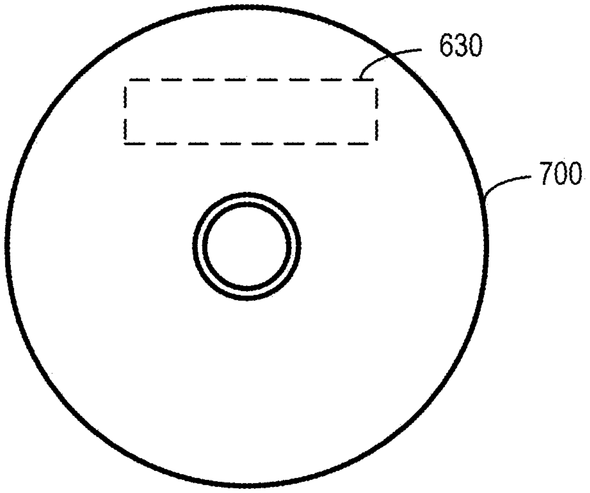
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus at least to:

receive, from a second apparatus, a master information block (MIB) message comprising bits that indicate configurations associated with a plurality of repetitions of a physical downlink control channel (PDCCH) transmission, wherein the configurations comprise the following: a repetition factor of the plurality of repetitions; an indication that the plurality of repetitions is enabled; information on a starting PDCCH monitoring occasion for the plurality of repetitions; and a periodicity of the starting PDCCH monitoring occasion for the plurality of repetitions, wherein the bits in the MIB message comprises the following: at least one spare bit; a first set of bits for indicating whether a cell is barred; a second set of bits for indicating a subcarrier offset between a first synchronization signal and physical broadcast channel (PBCH) block (SSB) and a reference resource block grid or for indicating whether the first SSB has a CORESET for an associated PDCCH; and a third set of bits for indicating a CORESET, a common search space and PDCCH parameters or for indicating frequency positions where an SSB with system information block 1 (SIB1) can or cannot be found, wherein a value of the second set of bits indicates at least one configuration to the first apparatus and indicates to the first apparatus that an SSB having a CORESET for an associated PDCCH configured with repetitions is in a range of global synchronization channel numbers (GSCNs), wherein the value indicates to a third apparatus that an SSB having a CORESET for an associated PDCCH is absent in the range of GSCNs, and wherein the value is 31 in frequency range 1 or 15 in frequency range 2;

determine mapping information between the configurations and the at least one bit in the MIB message;

based on this mapping information, determine the configurations; and monitor, based on the configurations, the plurality of repetitions of the PDCCH transmission from the second apparatus.

2. The first apparatus according to claim 1, wherein the subcarrier offset between the first SSB and the reference resource block grid is predefined.

3. The first apparatus according to claim 1, wherein the subcarrier offset between the first SSB and the reference resource block grid is associated with the value of the second set of bits and a predetermined offset.

4. The first apparatus according to claim 3, wherein at least one bit of the third set of bits indicates the number of repetitions of the PDCCH transmission.

5. The first apparatus according to claim 4, wherein the PDCCH comprises Type0-PDCCH.

6. The first apparatus according to claim 5, wherein the PDCCH transmission is performed in a band for a non-terrestrial network (NTN).

7. The first apparatus according to claim 6, wherein the first apparatus is a user equipment and the second apparatus is a network device.

8. A system comprising:

a first apparatus comprising:

at least one processor; and at least one memory storing instructions that, when executed by the at least one processor, cause the first apparatus at least to:

receive, from a second apparatus, a master information block (MIB) message comprising bits that indicate configurations associated with a plurality of repetitions of a physical downlink control channel (PDCCH) transmission, wherein the configurations comprise the following: a repetition factor of the plurality of repetitions; an indication that the plurality of repetitions is enabled; information on a starting PDCCH monitoring occasion for the plurality of repetitions; and a periodicity of the starting PDCCH monitoring occasion for the plurality of repetitions, wherein the bits in the MIB message comprises the following: at least one spare bit; a first set of bits for indicating whether a cell is barred; a second set of bits for indicating a subcarrier offset between a first synchronization signal and physical broadcast channel (PBCH) block (SSB) and a reference resource block grid or for indicating whether the first SSB has a CORESET for an associated PDCCH; and a third set of bits for indicating a CORESET, a common search space and PDCCH parameters or for indicating frequency positions where an SSB with system information block 1 (SIB1) can or cannot be found, wherein a value of the second set of bits indicates at least one configuration to the first apparatus and indicates to the first apparatus that an SSB having a CORESET for an associated PDCCH configured with repetitions is in a range of global synchronization channel numbers (GSCNs), wherein the value indicates to a third apparatus that an SSB having a CORESET for an associated PDCCH is absent in the range of GSCNs, and wherein the value is 31 in frequency range 1 or 15 in frequency range 2;

determine mapping information between the configurations and the at least one bit in the MIB message;

based on this mapping information, determine the configurations; and monitor, based on the configurations, the plurality of repetitions of the PDCCH transmission from the second apparatus.

9. The system according to claim 8, wherein the subcarrier offset between the first SSB and the reference resource block grid is predefined.

10. The system according to claim 8, wherein the subcarrier offset between the first SSB and the reference resource block grid is associated with the value of the second set of bits and a predetermined offset.

11. The system according to claim 10, wherein at least one bit of the third set of bits indicates the number of repetitions of the PDCCH transmission.

12. The system according to claim 11, wherein the PDCCH comprises Type0-PDCCH.

13. The system according to claim 12, wherein the PDCCH transmission is performed in a band for a non-terrestrial network (NTN).

14. The system according to claim 13, wherein the first apparatus is a user equipment and the second apparatus is a network device.

15. A method comprising:

receiving, by a first apparatus from a second apparatus, a master information block (MIB) message comprising bits that indicate configurations associated with a plurality of repetitions of a physical downlink control channel (PDCCH) transmission, wherein the configurations comprise the following: a repetition factor of the plurality of repetitions; an indication that the plurality of repetitions is enabled; information on a starting PDCCH monitoring occasion for the plurality of repetitions; and a periodicity of the starting PDCCH monitoring occasion for the plurality of repetitions, wherein the bits in the MIB message comprises the following: at least one spare bit; a first set of bits for indicating whether a cell is barred; a second set of bits for indicating a subcarrier offset between a first synchronization signal and physical broadcast channel (PBCH) block (SSB) and a reference resource block grid or for indicating whether the first SSB has a CORESET for an associated PDCCH; and a third set of bits for indicating a CORESET, a common search space and PDCCH parameters or for indicating frequency positions where an SSB with system information block 1 (SIB1) can or cannot be found, wherein a value of the second set of bits indicates at least one configuration to the first apparatus and indicates to the first apparatus that an SSB having a CORESET for an associated PDCCH configured with repetitions is in a range of global synchronization channel numbers (GSCNs), wherein the value indicates to a third apparatus that an SSB having a CORESET for an associated PDCCH is absent in the range of GSCNs, and wherein the value is 31 in frequency range 1 or 15 in frequency range 2;

determining, by the first apparatus, mapping information between the configurations and the at least one bit in the MIB message;

based on this mapping information, determining, by the first apparatus, the configurations; and monitoring, by the first apparatus based on the configurations, the plurality of repetitions of the PDCCH transmission from the second apparatus.

16. The method according to claim 15, wherein the subcarrier offset between the first SSB and the reference resource block grid is associated with the value of the second set of bits and a predetermined offset.

17. The method according to claim 16, wherein at least one bit of the third set of bits indicates the number of repetitions of the PDCCH transmission.

18. The method according to claim 17, wherein the PDCCH comprises Type0-PDCCH.

19. The method according to claim 18, wherein the PDCCH transmission is performed in a band for a non-terrestrial network (NTN).

20. The method according to claim 19, wherein the first apparatus is a user equipment and the second apparatus is a network device.

* * * * *